US006619464B2

United States Patent
Peppel et al.

(10) Patent No.: US 6,619,464 B2
(45) Date of Patent: Sep. 16, 2003

(54) VERTICAL DIVERTER ASSEMBLY

(75) Inventors: George W. Peppel, Corsicana, TX (US); Richard B. Patrick, Denton, TX (US)

(73) Assignee: Rapistan Advertising Corp., Grand Rapids, MI (US)

( * ) Notice: Subject to any disclaimer, the term of this patent is extended or adjusted under 35 U.S.C. 154(b) by 0 days.

(21) Appl. No.: 10/054,778

(22) Filed: Jan. 23, 2002

(65) Prior Publication Data
US 2002/0104736 A1 Aug. 8, 2002

Related U.S. Application Data
(60) Provisional application No. 60/265,976, filed on Feb. 2, 2001.

(51) Int. Cl.[7] .......................... B65G 47/10; B65G 47/46
(52) U.S. Cl. .................. 198/369.2; 198/435; 198/836.1
(58) Field of Search .............................. 198/369.2, 435, 198/436, 836.1

(56) References Cited

U.S. PATENT DOCUMENTS

| 2,561,997 A | 7/1951 | Smith ........................ 198/122 |
| 3,447,670 A | 6/1969 | McKnight ................... 198/218 |
| 3,580,141 A | 5/1971 | Richter ............................. 93/8 |
| 4,179,020 A | * 12/1979 | Heusler et al. ............. 198/326 |
| 4,284,187 A | 8/1981 | Kramer et al. .............. 198/435 |
| 4,541,824 A | 9/1985 | Muller ........................ 493/29 |
| 5,205,393 A | 4/1993 | Malow et al. .............. 198/369 |
| 5,692,593 A | * 12/1997 | Ueno et al. .............. 198/369.2 |
| 5,715,930 A | 2/1998 | Hogenkamp ................ 198/435 |
| 5,909,796 A | * 6/1999 | Soldavini ................. 198/369.2 |
| 6,105,751 A | 8/2000 | Jentjens et al. ............. 198/435 |

FOREIGN PATENT DOCUMENTS

| DE | 19755204 A1 | 7/1998 |
| EP | 0774431 A1 | 5/1997 |
| GB | 2320235 A | 6/1998 |

OTHER PUBLICATIONS

PCT International Search Report dated Aug. 03, 2002, for PCT application corresponding to the present application.

* cited by examiner

Primary Examiner—Christopher P. Ellis
Assistant Examiner—Richard Ridley
(74) Attorney, Agent, or Firm—Van Dyke, Gardner, Linn & Burkhart, LLP

(57) ABSTRACT

A diverter assembly includes a frame and first and second driven conveying surfaces, which are supported by the frame. Each of the conveying surfaces is adapted to move between two positions. The first driven conveying surface is pivoted about an input end when moved between its first and second positions, while the second driven conveying surface is pivoted about an output end when moved between its first and second positions. The driven conveying surfaces are aligned when in their first positions and define a conveyor path for transporting articles from a first conveyor to a second conveyor. When in their respective second positions, the driven conveying surfaces define two separate conveyor paths—one aligned between the first and third conveyor to divert articles to the third conveyor, and the second driven conveying surface being generally horizontally aligned with the second conveyor.

47 Claims, 14 Drawing Sheets

VERTICAL DIVERTER ASSEMBLY

This application claims priority from provisional application entitled VERTICAL DIVERTER ASSEMBLY, Ser. No. 60/265,976, filed Feb. 2, 2001, the disclosure of which is incorporated by reference herein in its entirety.

TECHNICAL FIELD AND BACKGROUND OF THE INVENTION

The present invention generally relates to a device for transferring articles from a generally horizontal conveying surface to one of a plurality of vertically spaced conveying surfaces and, more particularly, to a high speed, high volume diverter which transfers articles with a substantially continuous throughput from a first conveyor section to one of two vertically spaced conveyors sections.

In article-handling systems, including baggage handling systems, articles are conveyed along conveying surfaces, such as provided by belts, rollers or the like, and are conveyed along a conveyor path which may include one or more alternate conveyor paths for sorting the articles to be handled. In order to redirect or divert articles to the various conveyor paths, article-handling systems typically include diverters, such as horizontal and vertical diverters at each point of sortation. These diverters redirect the flow of the articles from one conveyor path to another for, as noted above, sorting the articles. Vertical diverters heretofore have typically not achieved a high-speed throughput since they typically require the packages conveyed on the conveyors to be spaced apart to allow the diverter time to align between the desired conveying surfaces of the conveyor sections. As a result, the package sortation speed is not optimized.

Consequently, there is a need for a high-speed vertical diverter that increases the delivery and sortation speed of an article handling system by increasing the speed at which the diverter can direct the flow of articles.

SUMMARY OF THE INVENTION

The present invention provides a vertical diverter assembly which selectively directs the flow of articles from a first generally horizontal surface to one of two vertically spaced conveying surfaces in a rapid fashion to increase the sortation speed and, hence, delivery speed of an article handling system.

According to one form of the invention, a diverter assembly includes a frame and first and second driven conveying surfaces supported by the frame. The conveying surfaces are each adapted to move between a first position and a second position, with the first conveying surface being pivoted about its input end, and the second conveying surface being pivoted about its output end when pivoted between their respective first and second positions. In the first position, the conveying surfaces are aligned to define a first conveyor path for transporting articles from a first conveyor to a second conveyor. In the second position, the conveying surfaces define two separate conveyor paths, with the first driven conveying surface aligning between the first conveyor and a third conveyor positioned below the second conveyor to divert articles to the third conveyor, and the second driven conveying surface generally horizontally aligned with the second conveyor.

In one aspect, driven belts provide the conveying surfaces. In a further aspect, at least one of the belts is driven by a motorized roller.

In other aspects, the conveying surfaces are moved substantially simultaneously when moved between their first and second positions. Furthermore, the belts maybe continuously driven so as to maintain the flow of articles along the conveying path.

According to a further aspect, the first driven conveying surface is driven by a motorized roller at its input end, with first driven conveying surface being pivoted about the pivot axis of the motorized roller when the first driven conveying surface is moved between its first and second positions. In another aspect, a motorized roller at the output end drives the second driven conveying surface, with the second driven conveying surface being pivoted about the pivot axis of the motorized roller of the second driven conveying surface when the second driven conveying surface is moved between its first and second positions.

According to another aspect, the diverter assembly includes first and second conveyor sections, which include the first and second driven conveying surfaces, respectively. The first and second conveyor sections are interlinked whereby pivotally movement of one of the conveyor sections induces pivotal movement of the other conveyor section to thereby move the conveying surfaces between their respective first and second positions. In other aspects, the first and second conveyor sections pivot about the input end and the output end, respectively, when the conveying surfaces are pivoted between their first and second positions.

In yet other aspects, each of the first and second conveyor sections includes spaced apart sides on opposed sides of its respective conveying surface, which provide guides for articles conveyed on the conveying surfaces. For example, the sides may comprise generally vertical sides. Furthermore, the sides provide substantially continuous guide surfaces when the conveying surfaces are at their first positions and/or when the conveying surfaces are in their second positions. In order to minimize the interference between the sides when the conveying surfaces are moved between their first and second positions, at least one pair of the sides includes flexible panels. Preferably, each of the sides includes a flexible panel to minimize the interference between the sides.

According to another form of the invention, a diverter assembly includes a frame and first and second conveyor sections pivotally supported by the frame, with each conveyor section having a driven conveying surface. The conveyor sections are each adapted to pivot between a first position and a second position. In the first position, their conveying surfaces are aligned to define a first conveyor path for transporting articles from a first conveyor to a second conveyor. In the second position, the conveying surfaces are pivoted to a generally horizontal position to define two separate conveyor paths, with the conveying surface of the first conveyor section aligning between the first conveyor and a third conveyor positioned below the second conveyor to divert articles to the third conveyor, and the second conveying surface generally horizontally aligned with the second conveyor.

In one aspect, the conveyor sections are linked together such that rotation of the first conveyor section induces rotation of the second conveyor section. For example, rods may link the first and second conveyor sections.

In other aspects, each of the conveyor sections includes vertical guide surfaces to guide the articles being transported along the conveying surfaces of the conveyor sections.

In other aspects, the first conveyor section is pivoted about its input or charge end when it is moved between its first and second positions. The second conveyor section, in contrast, is pivoted about its discharge or output end when it is moved between its first and second position. Optionally, the conveyor sections are moved substantially simultaneously when moved between their first and second positions. Furthermore, the conveying surfaces are continuously driven so as to maintain the flow of articles along the conveying path.

In yet another form of the invention, the diverter assembly includes a frame, which is positionable between a first conveyor and a second conveyor, and means for conveying articles. The means for conveying is supported by the frame and is configured to switch between defining a first conveyor path for transporting articles from the first conveyor to the second conveyor and defining second and third conveyor paths, with the second conveyor path for diverting articles to a third conveyor below the second conveyor, and the third conveyor path for generally aligning with the second conveyor. The assembly further includes a control for switching the means for conveying.

In one aspect, the means for conveying comprises a pair of driven belts. In other aspects, the means comprises first and second conveyor sections, with the first conveyor section having a first conveying surface, and the second conveyor section having a second conveying surface. The first conveying surface pivots about a first pivot axis to move the first conveying surface between the first conveyor path and the second conveyor path. The second conveying surface pivots about a second pivot axis to move between the first conveyor path and the third conveyor path.

A method of diverting articles of the present invention includes conveying an article on a conveying surface along a first conveyor path between a first conveyor and a second conveyor, supporting the conveying surface by a frame, pivoting a first portion of the conveying surface about the frame to define a second conveyor path whereby the first portion is generally aligned between the first conveyor and a third conveyor, and pivoting a second portion of the conveying surface about the frame to a third conveyor path whereby the second portion is generally aligned with the second conveyor.

The present invention provides an improved diverter assembly that exhibits increased throughput of articles, such as baggage, thus increasing the capacity of an article handling system that incorporates the diverter assembly of the present invention.

These and other objects, advantages, purposes, and features of the invention will become more apparent from the study of the following description taken in conjunction with the drawings.

DETAILED DESCRIPTION OF THE PREFERRED EMBODIMENTS

Figure 1:
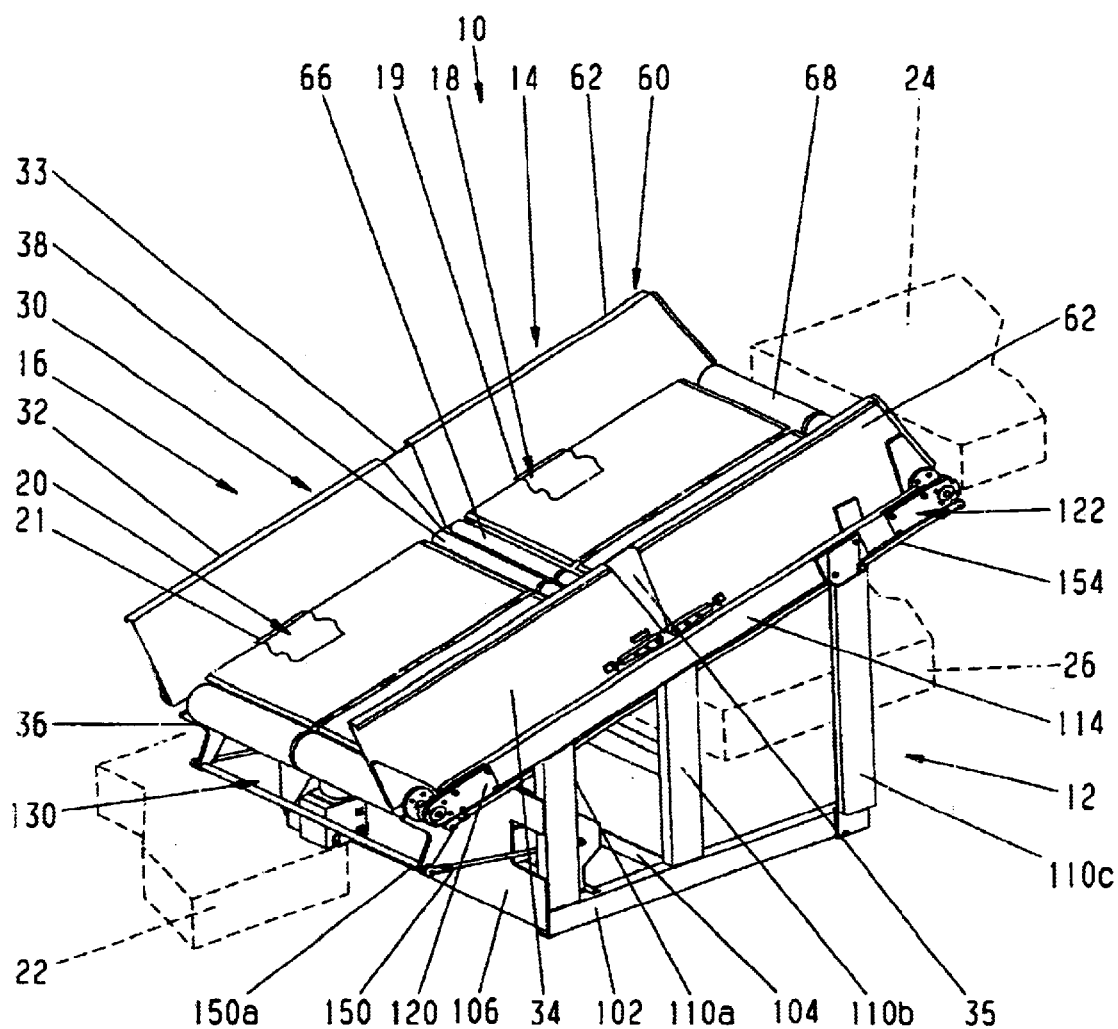
FIG. 1 is a front perspective view of a vertical diverter assembly of the present invention illustrating the two conveying surfaces of the diverter aligned to define a single conveying path.

Referring to FIGS. 1–5, the numeral 10 generally designates a vertical diverter assembly of the present invention. Diverter assembly 10 includes a frame 12 and upper and lower conveyor sections 14 and 16. Conveyor sections 14 and 16 include upper and lower conveying surfaces 18 and 20 defined by conveyor belts 19 and 21, respectively. Diverter assembly 10 comprises a modular diverter assembly which can be placed between the discharge end of a first conveyor section 22 and the charge ends of two vertically spaced conveyor sections 24 and 26 for diverting packages from the conveyor path defined between conveyor sections 22 and 26 to the conveyor path defined between conveyor sections 22 and 24. As will be more fully described below, conveyor sections 14 and 16 are movable between a first orientation (shown in FIG. 1) in which their respective conveying surfaces are aligned to provide a co-linear conveying surface or conveyor path for directing packages to upper conveyor section 24 and a second position in which lower conveying surface 20 is moved to a generally horizontal position to align with and direct packages to lower conveyor section 26 (FIG. 2), while upper conveying surface 18 is moved to a generally horizontal position to align with conveyor section 24.

Figure 6:
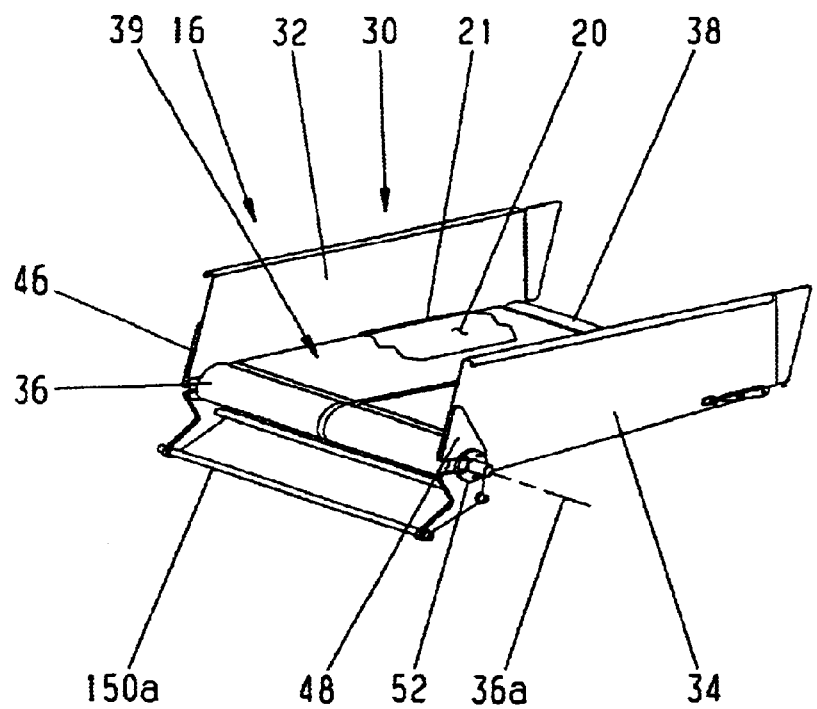
FIG. 6 is a front perspective view of a lower tilting conveyor section of the diverter assembly.
Figure 8:
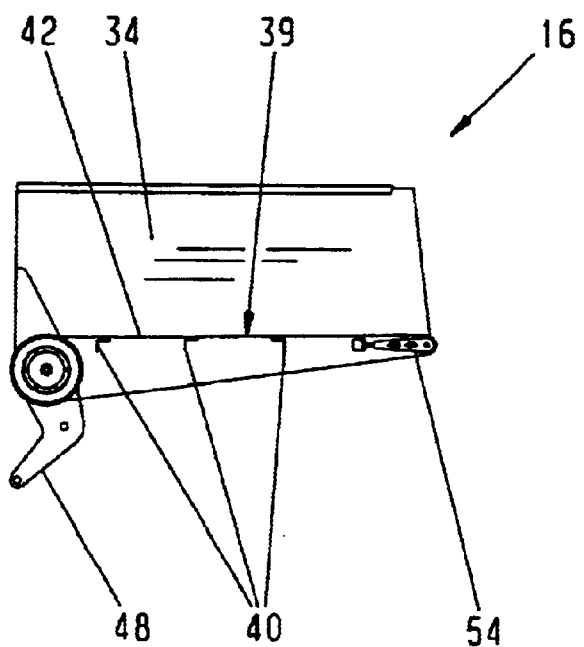
FIG. 8 is a side elevation view of the lower conveying surface of FIG. 6.
Figure 11:
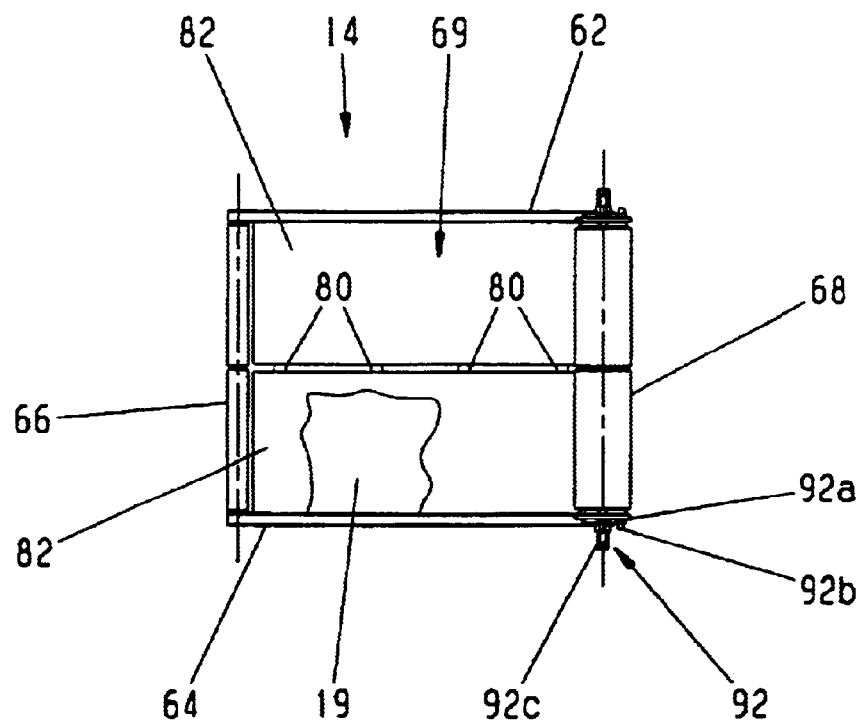
FIG. 11 is a top plan view of the conveying surface of FIG. 14.

Referring to FIG. 6, lower conveyor section 16 includes a frame 30 that supports conveyor belt 21. Frame 30 includes a pair of spaced apart, opposing vertical sides 32 and 34 and a belt support 39. Sides 32 and 34 provide vertical guide surfaces for articles being transported by belt 21. Referring to FIG. 8, belt support 39 comprises a plurality of transverse frame members 40 and upper plate members 42, which are supported by transverse frame members 40.

Plate members 42 and transverse frame members 40 are mounted to sides 32 and 34, such as by welding. Frame 30 supports a pair of rollers 36 and 38, which are mounted to frame 30 at opposed ends of belt support 39. Referring again to FIG. 8, upper plate members 42 extend between rollers 36 and 38 and are generally aligned with the upper surfaces of rollers 36 and 38 to provide substantially continuous support to belt 21. Belt 21 comprises a closed loop belt that extends over rollers 36 and 38 and over belt support 39 to define lower conveying surface 20. Roller 36 is mounted to the charge or input end of conveyor section 16 and is motorized to drive belt 21. Suitable motorized rollers are available from Vandergraaf of Toronto, Canada. Roller 38 comprises an idler roller and is mounted to the output end or discharge end of conveyor section 16.

Figure 2:
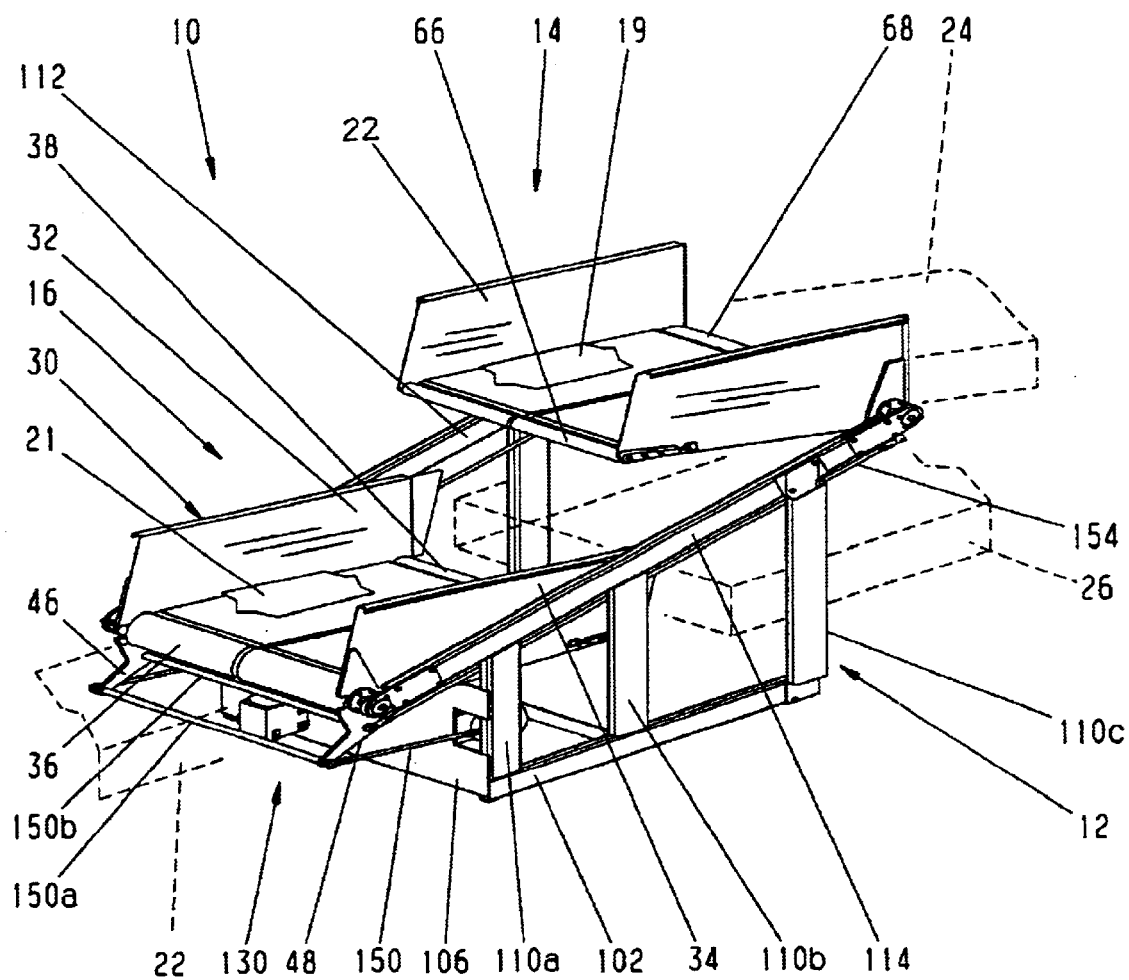
FIG. 2 is a perspective view of the diverter assembly of FIG. 1 illustrating the conveying surfaces of the diverter moved to a second orientation such that the lower conveying surface is aligned for aligning with a lower conveyor section, and the upper conveying surface is aligned with an upper conveyor section.
Figure 5:
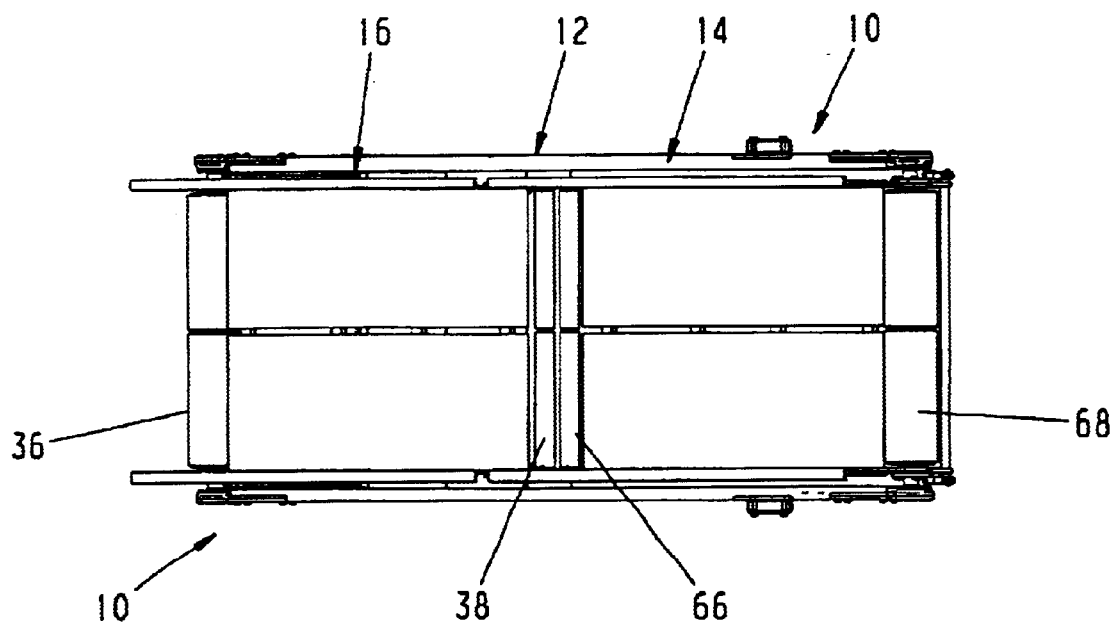
FIG. 5 is a top plan view of the diverter assembly of FIGS. 3 and 4.
Figure 3:
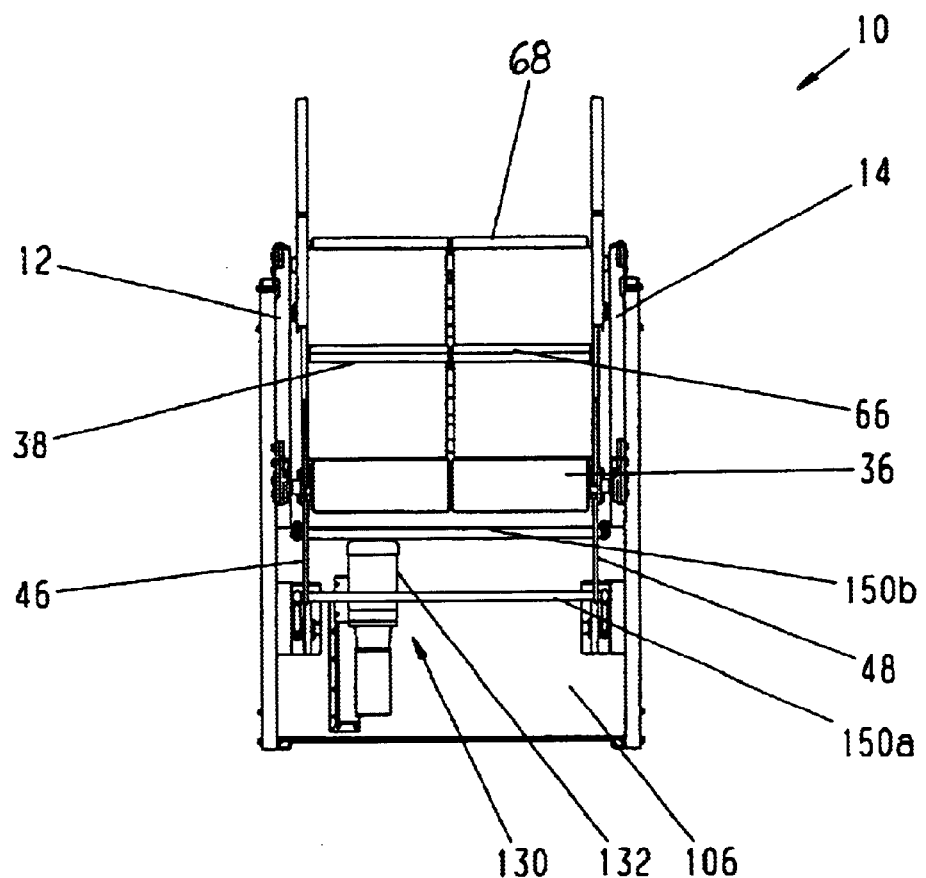
FIG. 3 is a front elevation view of the diverter assembly of FIG. 1.

Mounted to the input end of sides 32 and 34 are rocker arms 46 and 48. As will be more fully described in reference to drive assembly 130, crank or rocker arms 46 and 48 pivot conveyor section 16 about frame to move conveyor section 16 from its first position, in which conveyor surface 20 is aligned with conveyor surface 18, and its second position in which conveyor surface 20 is aligned with conveyor section 26 (FIG. 2). In the illustrated embodiment, roller 36 includes rod ends 50 which are supported in C-shaped blocks 51 mounted in slotted openings 32a and 34a of sides 32 and 34 and in corresponding slotted openings 46a and 48b of rocker arms 46 and 48. Rod ends 50 are rotatably mounted in blocks 51 by clamp bars 51a, which are secured to C-shaped blocks 51 by fasteners 51b. Aligned with rods 50 is a pair of mounting collars 52. Each mounting collar 52 includes a mounting flange 52b, through which fasteners 52a extend to mount mounting collar 52 onto a respective rocker arm 46, 48, and a pivot cylinder 52c. Pivot cylinders 52c mount lower conveyor section 16 in frame 12, as will be more fully described in reference to FIGS. 14–17. Therefore, when rocker arms 46 and 48 are pulled or pushed by drive assembly 130, lower conveyor section 16 will pivot about pivot cylinder 52c and also about the rotational axis 36a of pulley 36. In order to provide adjustment for the tension on belt 21, at least pulley 38 is mounted to side frame members 32 and 34 in a slotted opening 32b, 34b with its respective rod extending into a roller adjuster 54. Roller adjuster 54 provides linear adjustment of pulley 38 to increase or decrease the tension on belt 21 as will be understood by those skilled in the art.

Figure 7:
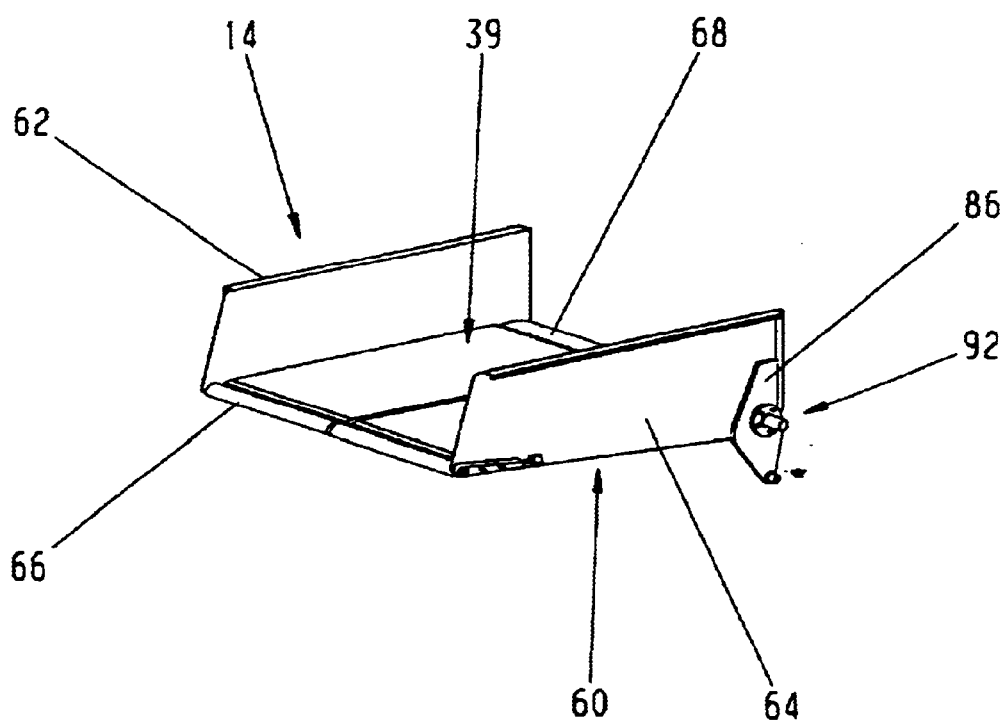
FIG. 7 is a front perspective of the upper tilting conveyor surface.
Figure 9:
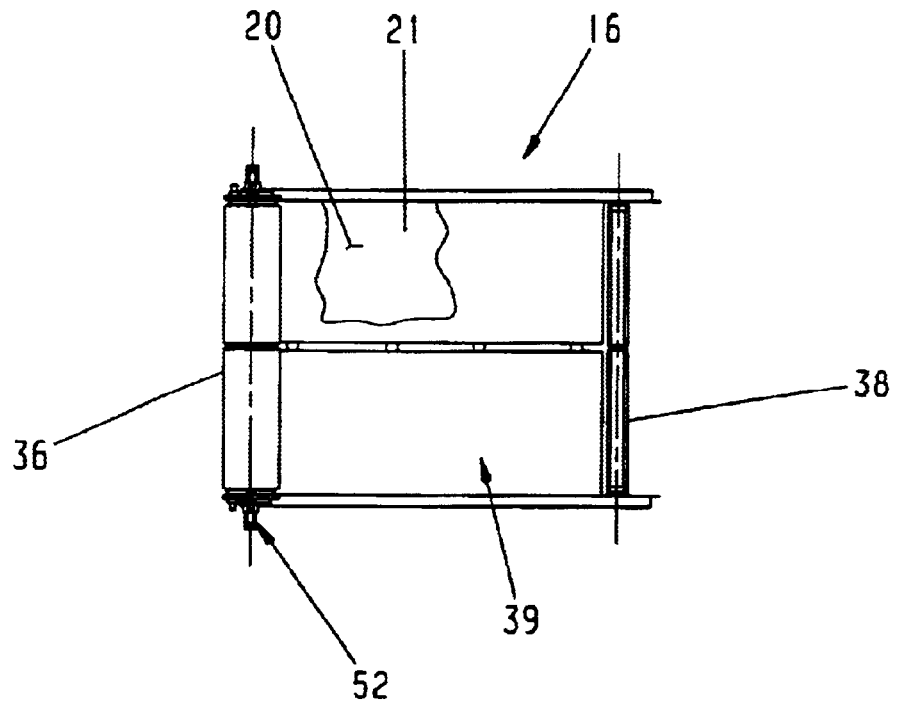
FIG. 9 is a top plan view of the conveying surface of FIG. 8.

Referring to FIG. 7, upper conveyor section 14 similarly includes a frame 60 that supports belt 19. Frame 60 includes a pair of opposed, spaced apart sides 62 and 64 and a belt support 69. Sides 62 and 64 similarly provide generally vertical guide surfaces for article being conveyed on belt 19. In addition, sides 62 and 84 preferably align with sides 32 and 34 when conveyor sections 14 and 16 are pivoted to their first position (FIG. 1). In order to minimize interference between sides 62, 64 and 32, 34, sides 32 and 34 may include flexible extensions or panels 33 and 35 (FIG. 1), which deflect as needed to accommodate potential interference between the sides. However, extensions 33 and 35 should have sufficient stiffness to provide continuous vertical guide surfaces for the articles being transported between the sides.

Figure 10:
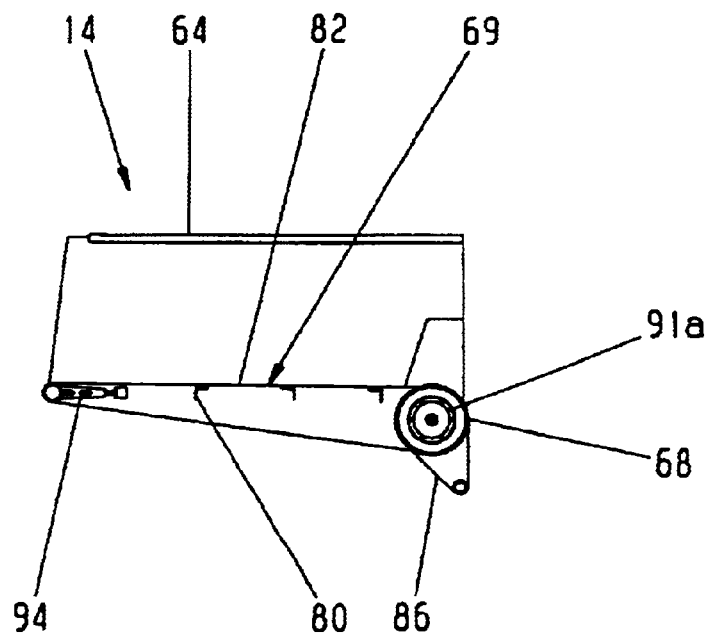
FIG. 10 is a side elevation view of the upper conveying surface of FIG. 7.

Mounted between side frame members 62 and 64 are a pair of rollers 66 and 68. Roller 68 is mounted to discharge end of conveyor section 14 and comprises a motorized roller with a drum motor to drive belt 19. Preferably, both rollers 36 and 68 continuously drive belts 19 and 21 so as to maintain the flow of articles along the conveying path, whether it is defined between conveyor 22, conveyor section 16, and conveyor 26 or between conveyor 22, conveyor sections 14, 16, and conveyor 24. Roller 66 comprises an idler roller and is mounted to charge or input end of conveyor section 14. Referring to FIG. 10, belt support 69 is of similar construction to belt support 39 and includes a plurality of transverse members 80 which extend transversely between sides 62 and 64 and which are mounted thereto, for example, by welding. Extending over transverse members 80 is a pair of plate members 82. Again referring to FIG. 10, plate members 82 generally align with the upper surface of rollers 66 and 68 to provide continuous support for belt 19 and are secured to sides 62 and 64, such as by welding or the like.

Figure 13:
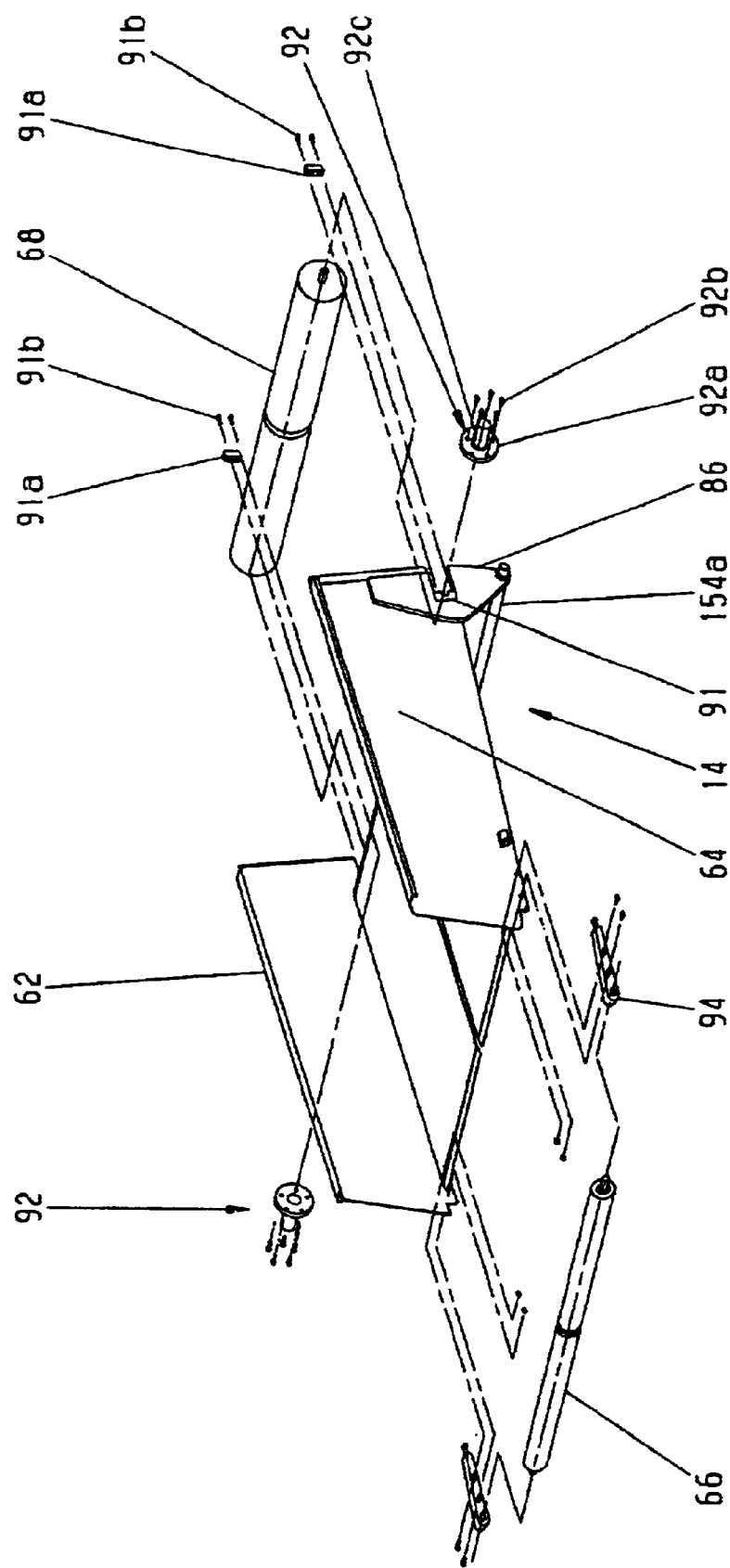
FIG. 13 is an exploded perspective view of the upper conveyor surface of FIG. 7.
Figure 14:
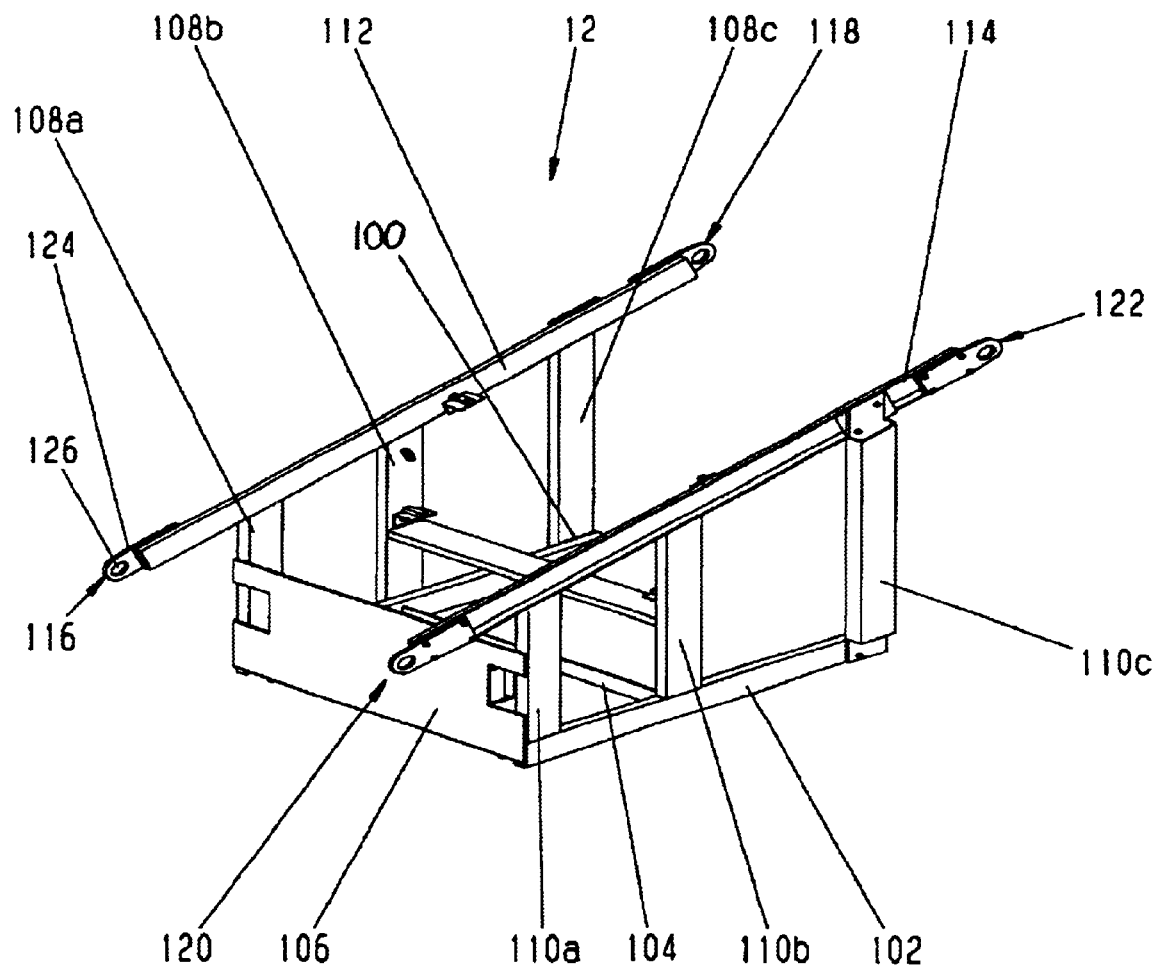
FIG. 14 is a front perspective view of the frame of the diverter assembly of FIGS. 1–5.
Figure 16:
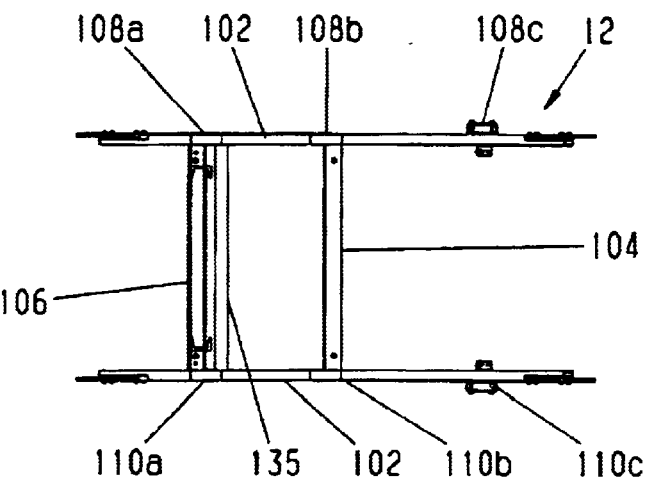
FIG. 16 is a top plan view of the frame assembly of FIGS. 10–12.
Figure 17:
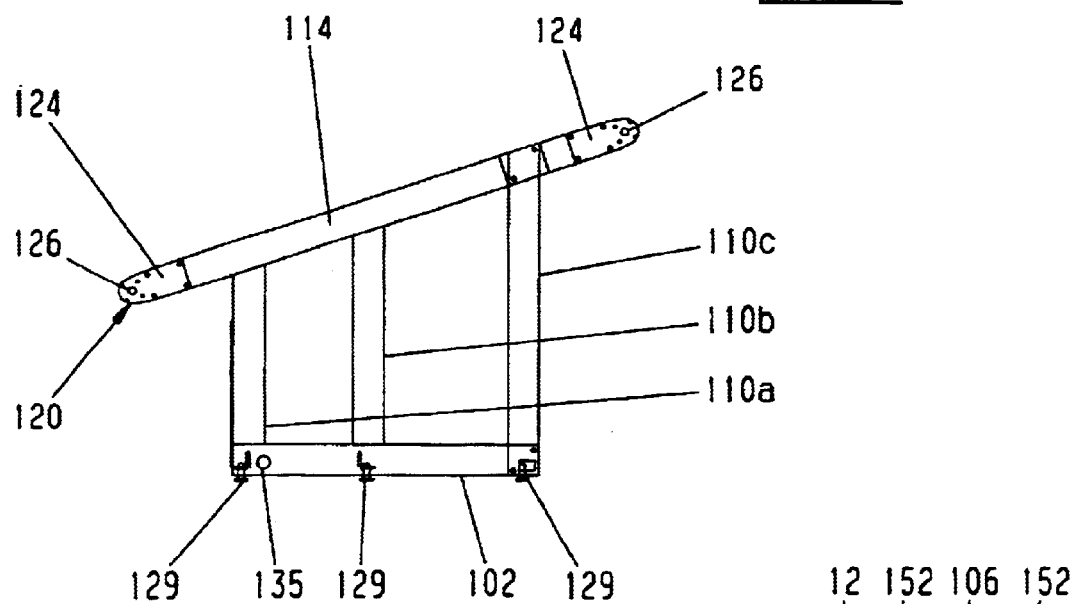
FIG. 17 is a side elevation view of the frame assembly of FIGS. 10 and 11.
Figure 15:
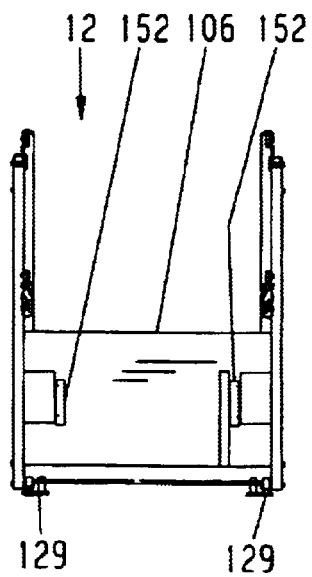
FIG. 15 is a front elevation view of the vertical frame assembly of FIG. 10.

Referring again to FIG. 7, upper conveyor section 14 includes a pair of rocker arms 86 and 88 that are mounted to side frame members 62 and 64. Similarly, referring to FIG. 13, rod ends 90 of roller 68 are supported in C-blocks 91 mounted in slotted openings 62a and 64a of sides 62 and 64 and slotted openings 86a and 88a of rocker arms 86 and 88. Rod ends 90 are rotatably mounted in blocks 91 by clamp bars 91a that secure to blocks 91 by fasteners 91b. Similar to conveyor section 16, conveyor section 14 includes a pair of mounting collars 92 mounted to sides 82 and 84 at rocker arms 86 and 88, which are aligned with rod ends 90 of roller 68. Mounting collars 92 include a mounting flange 92a, which is secured to rocker arms 86 and 88 by fasteners, and a pivot cylinder 92c, which is journaled in frame 12 to provide a pivot joint for conveyor section 14, as will be more fully described below. Thus, when rocker arms 82 and 88 are pivoted, upper conveyor section 14 will pivot about rotational axis 68a of roller 68.

Referring to FIGS. 14–17, frame 12 includes base frame members 100, 102, which are interconnected by a medial transverse member 104 and a transverse plate member 106 that provides a cover for at least a portion of the drive assembly 130, which will be more fully described below in reference to FIGS. 18–20. Frame 12 further includes a plurality of vertical frame members 108a, 108b, 108c, and 110a, 110b, 110c, which are mounted to base frame members 100, 102 and which are secured to and provide support for side rails 112 and 114. Side rails 112 and 114 each include a pair of roller mounts 116, 118, 120, 122, respectively, at their opposed ends in which upper and lower conveyor sections 14, 16 are mounted by pivot cylinders 52c and 92c of mounting collars 52 and 92, respectively. In the illustrated embodiment, frame 12 is assembled using conventional structural members, such as rectangular tubing; however, it should be understood that frame 12 may be assembled using other structural members. Furthermore, the structural members forming frame 12 may be connected using fasteners, welds or rivets as is conventionally known. In the illustrated embodiment, roller mounts 116, 118, 120, and 122 comprise plate members 124 with transverse openings 126, with pivot cylinders 52c and 92c journaled in openings 126 to define pivot axes for conveyor sections 14 and 16. Plate members 124 are secured to rail members 112 and 114, for example by fasteners. However, it should be understood that roller mounts 116, 118, 120, and 122 may be mounted to rail members 112 and 114 by rivets or welds or the like. In addition, frame 12 optionally includes threaded, leveling feet 129 mounted to base frame members 100 and 102 that provide adjustment and leveling for diverter assembly 10.

Referring again to FIGS. 1 and 2 and as noted above, cylindrical members 52c and 92c of mounting collars 52 and 92 extend into roller mounts 116, 118, 120, and 122 to thereby pivotally mount upper and lower conveyor sections 14 and 16 on frame 12 so that conveyor sections 14 and 16 can be pivoted about axes 36a and 68a to move conveying surfaces 18 and 20 between their two positions shown in FIGS. 1 and 2. Conveyor sections 14 and 16 are moved about pivot axes 36a and 68a by a drive assembly 130.

Figure 4:
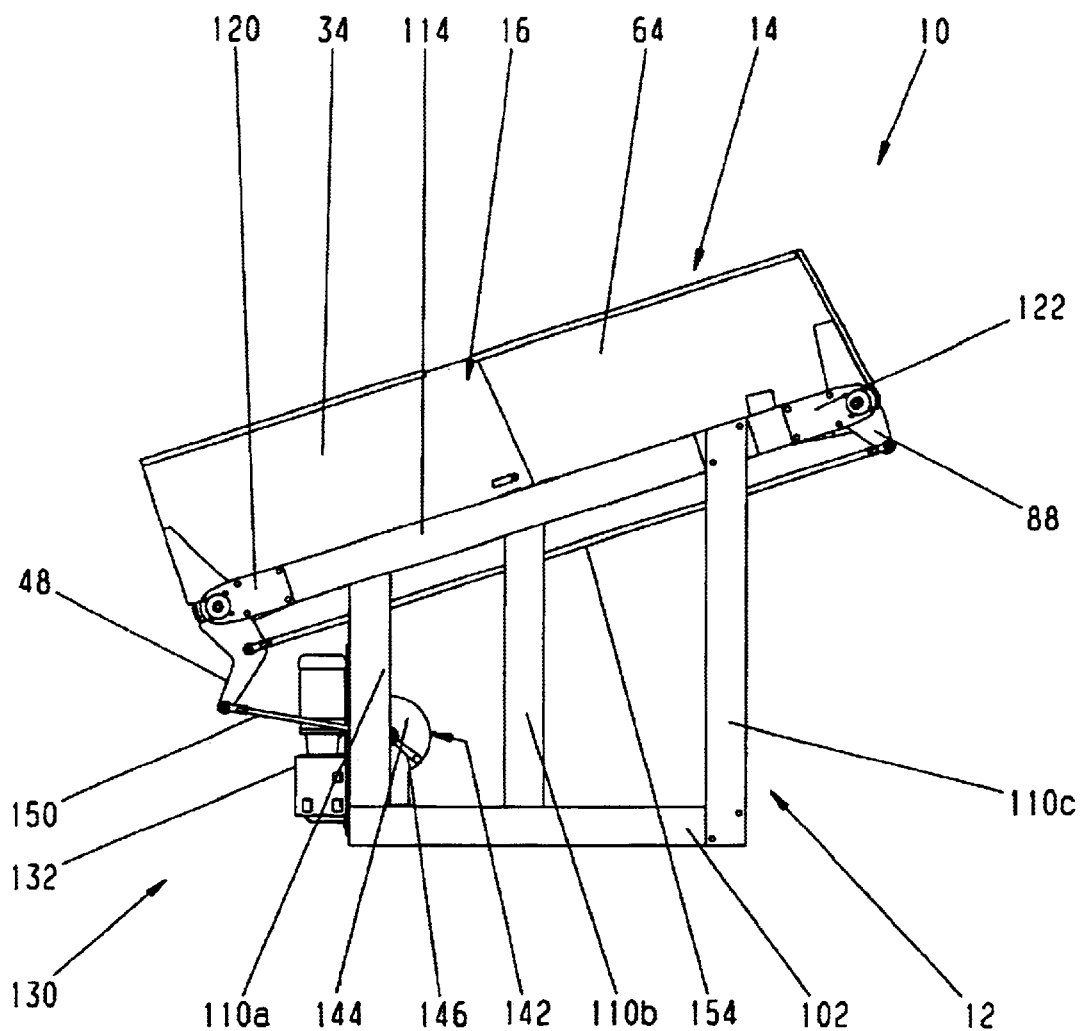
FIG. 4 is a side elevation view of the diverter assembly of FIG. 3.
Figure 12:
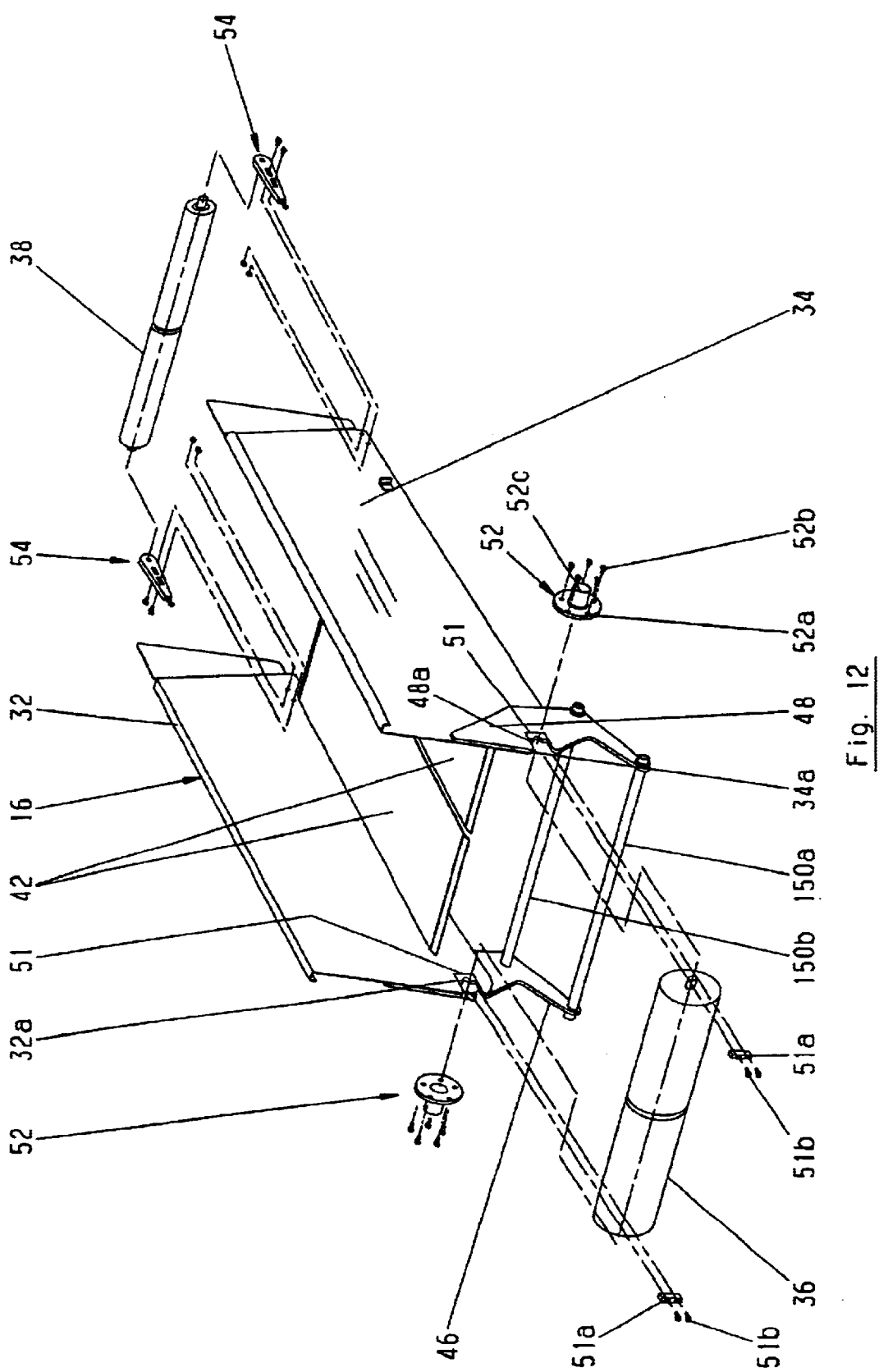
FIG. 12 is an exploded perspective view of the lower conveying surface of FIG. 6.
Figure 18:
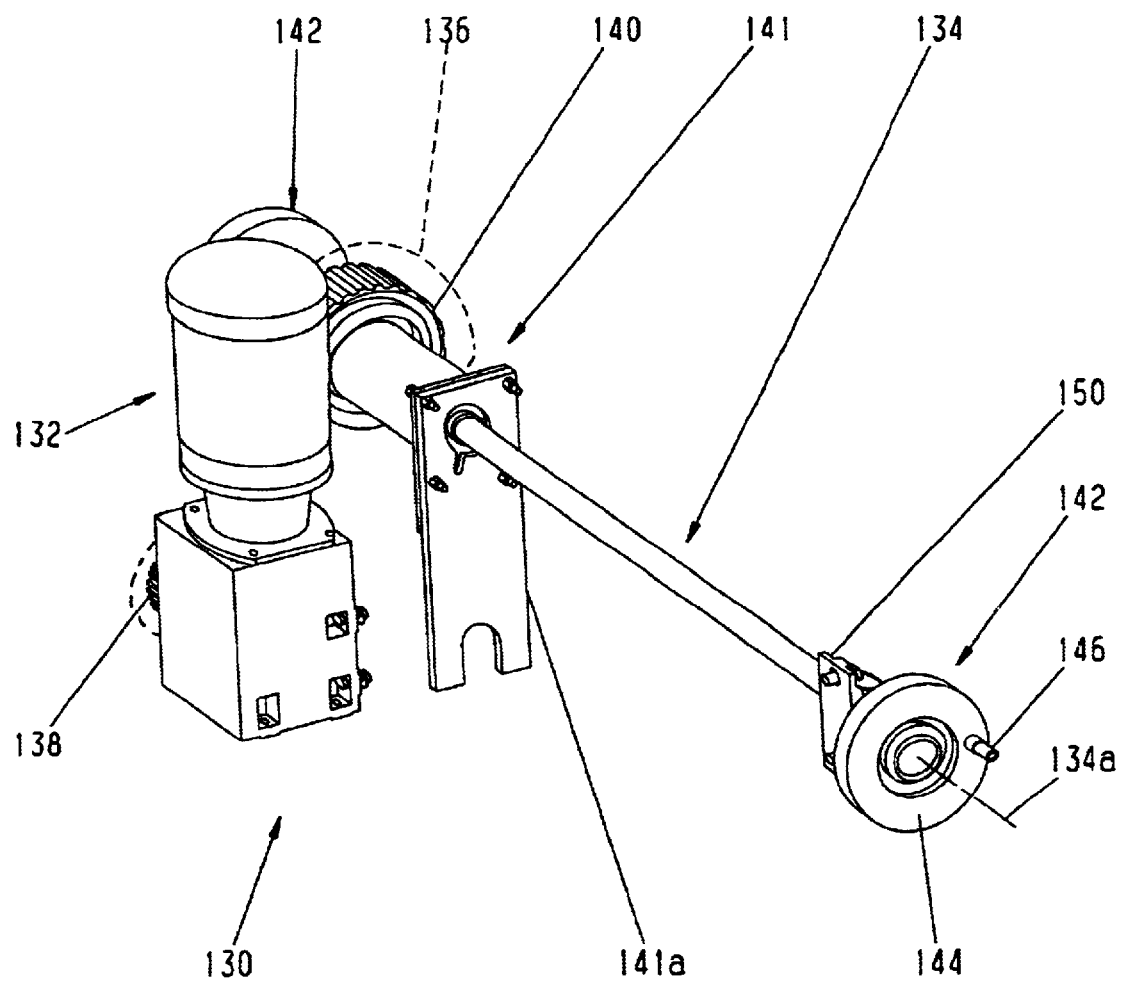
FIG. 18 is a perspective view of the drive mechanism of the diverter assembly.
Figure 19:
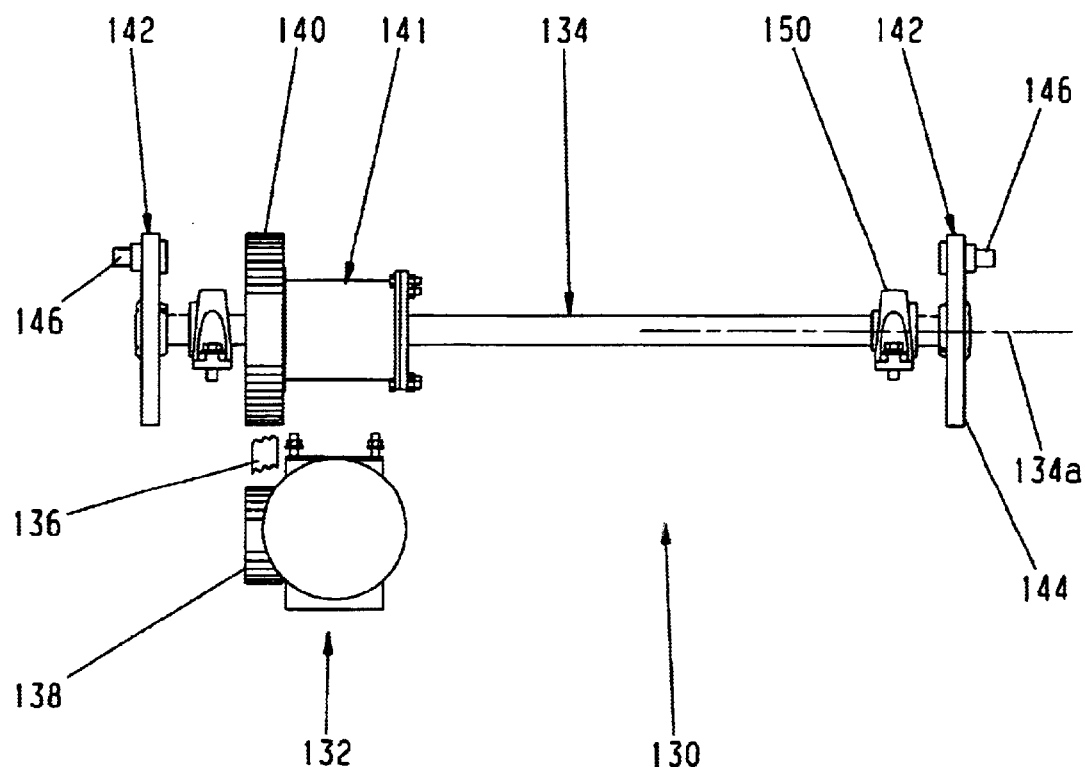
FIG. 19 is a top plan view of the driver assembly of FIG. 18.
Figure 20:
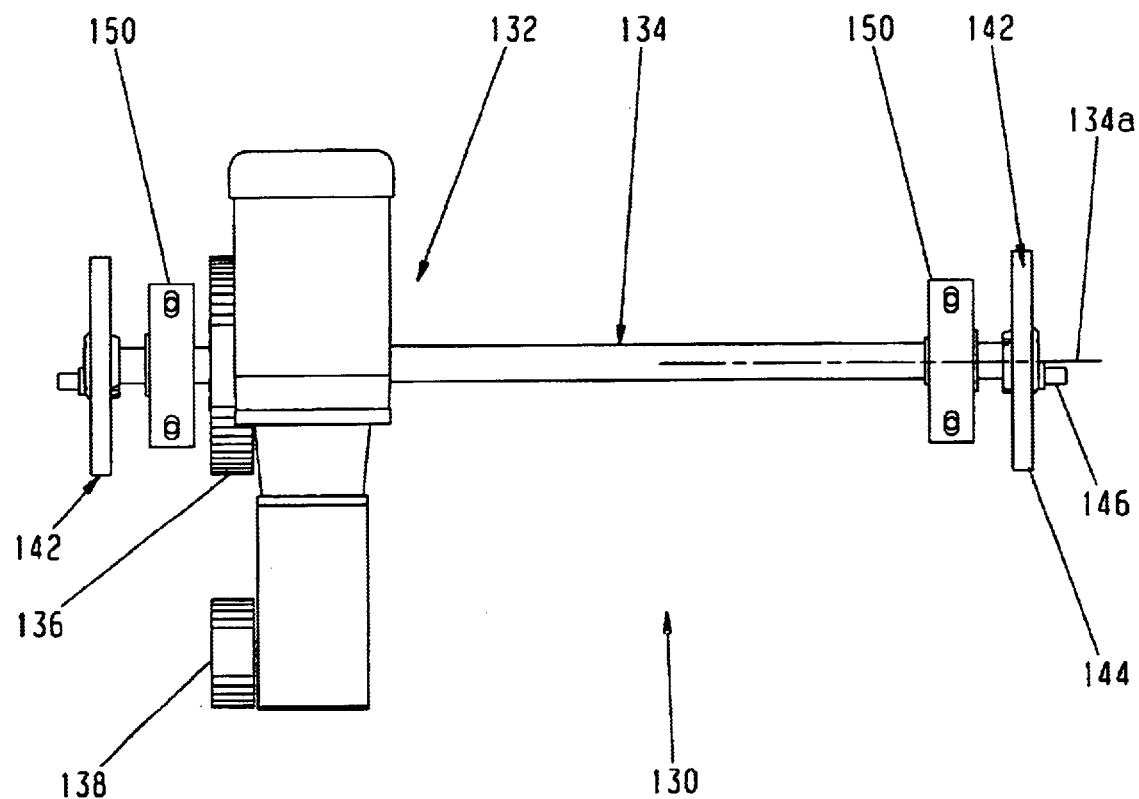
FIG. 20 is a side elevation view of the driver assembly of FIG. 19.

Referring to FIGS. 1–4 and 18–20, drive assembly 130 includes a motor 132 and a drive shaft 134. Motor 132 is coupled to drive shaft 134 by a belt 136 that extends around the output drive pulley 138 of motor 132 and over a timing pulley 140, which is mounted to drive shaft 134. In addition, in the illustrated embodiment, drive assembly 130 includes a clutch brake 141, such as is available form Warner, which provides a brake and further permits disengagement of motor 132 from drive shaft 134 in the event of a jam or the like. Referring to FIG. 18, clutch brake 141 is supported by a clutch brake plate 141a. As best understood from FIG. 15, clutch brake plate 141a rests on and is supported by a transverse support 135, which extends between and is mounted to base frame members 102. Shaft 134 is supported by a pair of bearing blocks 150, such as pillow blocks, which in turn mount to supports 152, such as angle members, that are secured to plate member 106 between vertical frame members 108a and 110a by fasteners, welds, rivets or the like. Mounted to opposed ends of drive shaft 134 is a pair of crankshaft assemblies 142. Crank shaft assemblies 142 each include a crank disk 144 and crank pin 146 that is mounted to crank disk 144 offset from the rotational axis 134a of drive shaft 134. Referring to FIGS. 1, 2 and 4, crank pins 146 are coupled to rocker arms 46 and 48 of lower conveyor section 16 by tie rods 150, which are mounted to distal end portions 46a and 48a of rocker arms 46 and 48. Rocker arms 46 and 48 are interconnected by tie rods 150a and 150b (FIG. 12), which extend through rockers arms 46 and 48 to provide mounts for tie rods 150. In this manner, when tie rods 150 push or pull on rocker arms 46, 48, conveyor section 16 pivots about axis 36a.

As best seen in FIG. 1, when crank disks 142 rotated such that crank pins 146 are positioned at a three o'clock position (as viewed in FIG. 1), lower conveyor section 16 is rotated upwardly. As best seen in FIG. 4, medial portions of rocker arms 46 and 48 are connected to the respective lower portions of rocker arms 86 and 88 by tie rods 154. Rocker arms 86 and 88 are interconnected by a tie rod 154a, which projects through rocker arms 86 and 88 to provide mounts for tie rods 154. In this manner, when rocker arms 46 and 48 are rotated about rotational axis 36a of roller 36 by the movement of tie rods 150, rocker arms 86 and 88 simultaneously pivot upper conveyor section 14 to align with lower conveyor section 16. In this manner, conveying surfaces 20 and 18 define a substantially continuous path for article which is to be diverted from the generally horizontal conveying path defined between conveyor sections 22 and 26 to the second conveying path defined between conveyor section 22 and 24. Similarly, when crank disks 142 are rotated in a clockwise direction to move crank pin 146 to the nine o'clock position, tie rods 150 push on distal portions 46a and 48a of rocker arms 46 and 48 to pivot lower conveyor section 16 to a generally horizontal position as shown in FIG. 2. At the same time, tie rods 154 pull on lower portion of rocker arms 86 and 88 to pivot upper conveyor section 14 upwardly so that as shown in the illustrated embodiment, conveying surface 18 is generally aligned with the conveying surface of conveyor section 24. In this manner, articles, which are supported on conveying surface 18, may be continued to be processed and directed to conveyor section 24 while articles on conveying surface 20 may be continued to be carried and processed on conveying surface 20 of lower conveyor section 16 for delivery to conveyor section 26.

It can be appreciated from the foregoing that the diverter assembly of the present invention provides a diverter that can sort articles at varying speeds, including sortation speeds for articles, such as luggage, of at least 30 bags per minute, including 40 bags per minute.

While one form of the invention has been shown and described, other forms or modifications will now be apparent to those skilled in the art. For example, conveyor sections 14, 16 may comprise roller conveyor sections. In addition, one or more external motors may drive rollers 36 and 68. Furthermore, the structural members comprising the assembly frame (12) and frames 30, 60 for conveyor sections 14, 16 may be substituted with other conventional structural components.

While several forms of the invention have been shown and described, other forms will now be apparent to those skilled in the art. For example, as noted, the diverter assembly may incorporate a single driver to drive both belts or may incorporate a driver for each belt. Furthermore, each conveyor section may be pivoted by its own driver. The present invention also has application with rollers defining the conveying surface of the diverter assembly. Therefore, it will be understood that the embodiments shown in the drawings and described above are merely for illustrative purposes, and are not intended to limit the scope of the invention, which is defined by the claims, which follow as interpreted under the principles of patent law including the doctrine of equivalents.

We claim:

1. A diverter assembly comprising:
    a frame; and
    first and second driven conveying surfaces supported by said frame, each of said conveying surfaces being adapted to move between a first position and a second position, said first driven conveying surface pivoted about an input end when moved between its first and second positions, said second driven conveying surface being pivoted about an output end when moved between its first and second positions, said first and second driven conveying surfaces being aligned when in said first positions and defining a first conveyor path for transporting articles from a first conveyor to a second conveyor, said first and second driven conveying surfaces defining two separate conveyor paths when in said second positions, with said first driven conveying surface aligning between the first conveyor and a third conveyor positioned below the second conveyor to divert articles to the third conveyor, and said second driven conveying surface being generally horizontally aligned with the second conveyor.

2. The diverter assembly according to claim 1, wherein each of said conveying surfaces comprises a driven belt.

3. The diverter assembly according to claim 2, wherein at least one of said driven belts is driven by a motorized roller.

4. The diverter assembly according to claim 2, wherein said first driven conveying surface is driven by a motorized roller at said input end, said motorized roller having a pivot axis, said first driven conveying surface being pivoted about said pivot axis of said motorized roller when said first driven conveying surface is moved between its first and second positions.

5. The diverter assembly according to claim 2, wherein said second driven conveying surface is driven by a motorized roller at said output end, said motorized roller having a pivot axis, said second driven conveying surface being pivoted about said pivot axis of said motorized roller when said second driven conveying surface is moved between its first and second positions.

6. The diverter assembly according to claim 1, wherein said first and second driven conveying surfaces are pivoted substantially simultaneously when moved between their respective first and second positions.

7. The diverter assembly according to claim 6, further comprising first and second conveyor sections, said first and second conveyor sections including said first and second driven conveying surfaces, respectively, said first and second conveyor sections being interlinked whereby pivotally movement of one of said first and second conveyor sections induces pivotal movement of another of said first and second conveyor sections.

8. The diverter assembly according to claim 1, further comprising first and second conveyor sections, said first and second conveyor sections including said first and second driven conveying surfaces, respectively, said first and second conveyor sections pivoting about said input end and said output end, respectively, when said conveying surfaces are pivoted between their first and second positions.

9. The diverter assembly according to claim 8, wherein each of said first and second conveyor sections includes spaced apart sides on opposed sides of its respective conveying surface, said sides providing guides for articles conveyed on said conveying surfaces.

10. The diverter assembly according to claim 9, wherein said sides comprise generally vertical sides.

11. The diverter assembly according to claim 9, wherein said sides provide substantially continuous guide surfaces when said conveying surfaces are at their first positions.

12. The diverter assembly according to claim 11, wherein said sides provide substantially continuous guide surfaces when said conveying surfaces are at said second positions.

13. The diverter assembly according to claim 12, wherein at least one pair of said sides includes flexible panels to minimize interference between said sides when said conveying surfaces are moved between their first and second positions.

14. The diverter assembly according to claim 12, wherein each of said sides includes a flexible panel to minimize interference between said sides when said conveying surfaces are aligned.

15. The diverter assembly according to claim 1, wherein said first and second driven conveying surfaces are continuously driven so as to maintain the flow of articles along the conveying paths.

16. The diverter assembly according to claim 1, wherein said first driven conveying surface and said second driven conveying surface are driven by a common driver.

17. A diverter assembly comprises:
a frame;
a first conveyor section having an input end; and
a second conveyor section having an output end, said first and second conveyor sections pivotally supported by said frame at said input end and said output end, respectively, said first and second conveyor sections having first and second driven conveying surfaces cantilevered from said input end and said output end, respectively, each of said conveyor sections being adapted to pivot between a first position and a second position, said conveying surfaces of said conveyor sections being aligned to define a first conveyor path for transporting articles from a first conveyor to a second conveyor when said first and second conveyor sections are pivoted to their first positions, and said conveying surfaces being generally horizontal to define two separate conveyor paths, with said first driven conveying surface generally aligning between the first conveyor and a third conveyor positioned below the second conveyor to divert articles to the third conveyor, and said second driven conveying surface being generally aligned with the second conveyor when said first and second conveyor sections are pivoted to their second positions.

18. The diverter assembly according to claim 17, wherein said conveyor sections are linked together such that rotation of said first conveyor section induces rotation of said second conveyor section.

19. The diverter assembly according to claim 18, wherein said conveyor sections are linked together by rods.

20. The diverter assembly according to claim 17, further comprising a driver, said driver being drivingly coupled to and pivoting one of said conveyor sections, said one of said conveyor sections inducing the other of said conveyor sections to pivot.

21. The diverter assembly according to claim 17, wherein each of said conveying surfaces comprises a driven belt.

22. The diverter assembly according to claim 21, wherein at least one of said driven belts is driven by a motorized roller.

23. The diverter assembly according to claim 21, wherein each of said driven belts is driven by a motorized roller.

24. The diverter assembly according to claim 23, wherein each of said rollers has an axis of rotation, said first conveyor section pivoting about said axis of rotation of said roller of said first driven conveying surface when moved between its first position and said second position, and said second conveyor section pivoting about said axis of rotation of said roller of said second driven conveying surface when moved between its first position and said second position.

25. The diverter assembly according to claim 24, wherein said roller of said first driven conveying surface is positioned at an input end of said first conveyor section.

26. The diverter assembly according to claim 25, wherein said roller of said second driven conveying surface is positioned at an output end of said second conveyor section.

27. The diverter assembly according to claim 17, wherein said first conveyor section is pivoted about its input end when it is moved between its first and second positions.

28. The diverter assembly according to claim 27, wherein said second conveyor section is pivoted about its output end when it is moved between its first and second positions.

29. The diverter assembly according to claim 28, wherein said conveying surfaces are pivoted substantially simultaneously when said conveyor sections are moved between their respective first and second positions.

30. The diverter assembly according to claim 17, wherein each of said first and second conveyor sections includes spaced apart sides on opposed sides of its respective conveying surface, said sides providing guides for articles conveyed on said conveying surfaces.

31. The diverter assembly according to claim 30, wherein said sides comprise generally vertical sides.

32. The diverter assembly according to claim 30, wherein said sides provide substantially continuous guide surfaces when said conveyor sections are in said first positions.

33. The diverter assembly according to claim 32, wherein said sides provide substantially continuous guide surfaces when said conveyor sections are in said second positions.

34. A diverter assembly comprising:
a frame; and
first and second conveyor sections pivotally supported by said frame, said first and second conveyor sections having first and second driven conveying surfaces, respectively, each of said conveyor sections being adapted to pivot between a first position and a second position, said conveying surfaces of said conveyor sections being aligned to define a first conveyor path for transporting articles from a first conveyor to a second conveyor when said first and second conveyor sections are pivoted to their first positions, and said conveying surfaces being generally horizontal to define two separate conveyor paths, with said first driven conveying surface generally aligning between the first conveyor and a third conveyor positioned below the second conveyor to divert articles to the third conveyor, said second driven conveying surface being generally aligned with the second conveyor when said first and second conveyor sections are pivoted to their second positions, and wherein each of said first and second conveyor sections includes spaced apart sides on opposed sides of its respective conveying surface, said sides providing guides for articles conveyed on said conveying surfaces and comprising generally vertical sides, said sides providing substantially continuous guide surfaces when said conveyor sections are in said first positions and in said second positions, and wherein at least one pair of said sides includes flexible panels to minimize interference between said sides when said conveying surfaces moved between their first and second positions.

35. The diverter assembly according to claim 34, wherein each of said sides includes a flexible panel to minimize interference between said sides when said conveying surfaces are aligned.

36. A diverter assembly comprising:
a frame, said frame being positionable between a first conveyor and a second conveyor;
means for conveying articles, said means being supported by said frame and defining a first conveyor path for transporting articles from the first conveyor to the second conveyor and defining a second conveyor path, with said second conveyor path for diverting articles to a third conveyor below the second conveyor, and said means for conveying defining an input end at said first conveyor, a first output end at the second conveyor, and a second output end at the third conveyor;
means for switching said means for conveying between said first conveyor path and said second conveyor path, said means for switching driving said means for conveying at said input end and said first output end; and
a control for actuating said means for switching.

37. The diverter assembly according to claim 36, wherein said means for conveying comprises a pair of driven belts.

38. The diverter assembly according to claim 37, wherein at least one of said driven belts is driven by a motorized roller.

39. The diverter assembly according to claim 37, wherein each of said driven belts is driven by a motorized roller.

40. The diverter assembly according to claim 37, wherein said means for conveying comprises first and second conveyor sections, said first conveyor section having a first conveying surface, said first conveying surface pivoting about a first pivot axis to move said first conveying surface between said first conveyor path and said second conveyor path, said second conveyor section having a second conveying surface, and said second conveying surface pivoting about a second pivot axis to move between said first conveyor path and a third conveyor path.

41. The diverter assembly according to claim 40, wherein said first pivot axis is at said input end.

42. The diverter assembly according to claim 41, wherein said second pivot axis is at said first output end.

43. The diverter assembly according to claim 42, wherein said first and second conveying surfaces are pivoted substantially simultaneously when moved between the respective conveyor paths.

44. A method of diverting articles from a first conveyor path between a first conveyor and a second conveyor to a second conveyor path between the first conveyor and a third conveyor positioned beneath the second conveyor, said method comprising:
conveying an article on a conveying surface along a first conveyor path between a first conveyor and a second conveyor;
supporting the conveying surface by a frame, wherein said supporting includes cantilevering a first portion of the conveying surface about the frame and cantilevering a second portion of the conveying surface about the frame;
driving the first portion of the conveying surface about the frame at its input end to define a second conveyor path whereby the first portion is generally aligned between the first conveyor and a third conveyor; and
driving the second portion of the conveying surface about the frame at its output end to a third conveyor path whereby the second portion is generally aligned with the second conveyor.

45. The method of diverting articles according to claim 44, wherein said driving the first portion and driving the second portion are generally simultaneous.

46. The method of diverting articles according to claim 44, further comprising driving the conveying surface while driving said first portion and driving said second portion.

47. The method of diverting articles according to claim 44, further comprising inducing said driving of the second portion by driving the first portion.

* * * * *